March 28, 1961 M. L. DOELZ ET AL 2,977,417
MINIMUM-SHIFT DATA COMMUNICATION SYSTEM
Filed Aug. 18, 1958 9 Sheets-Sheet 5
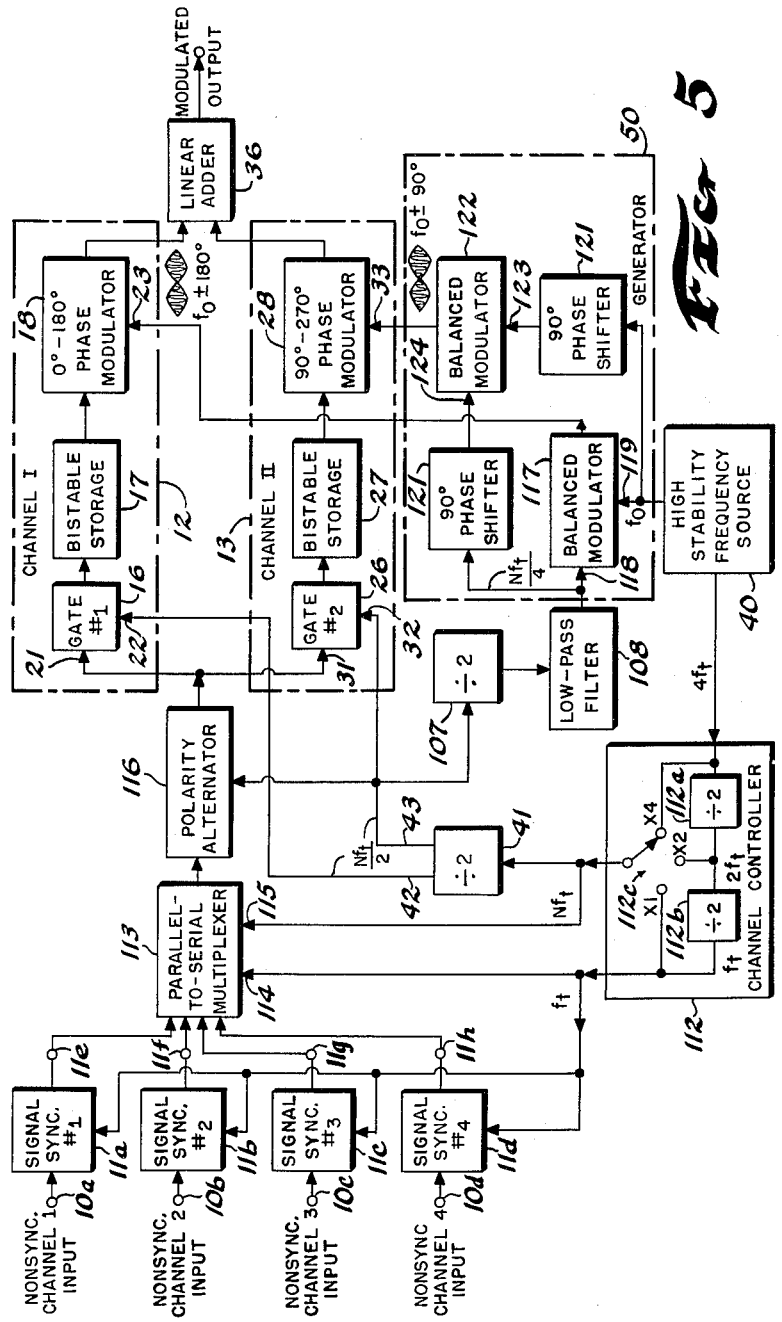
INVENTORS
MELVIN L. DOELZ
EARL T. HEALD
BY Moody and Goldman
ATTORNEYS

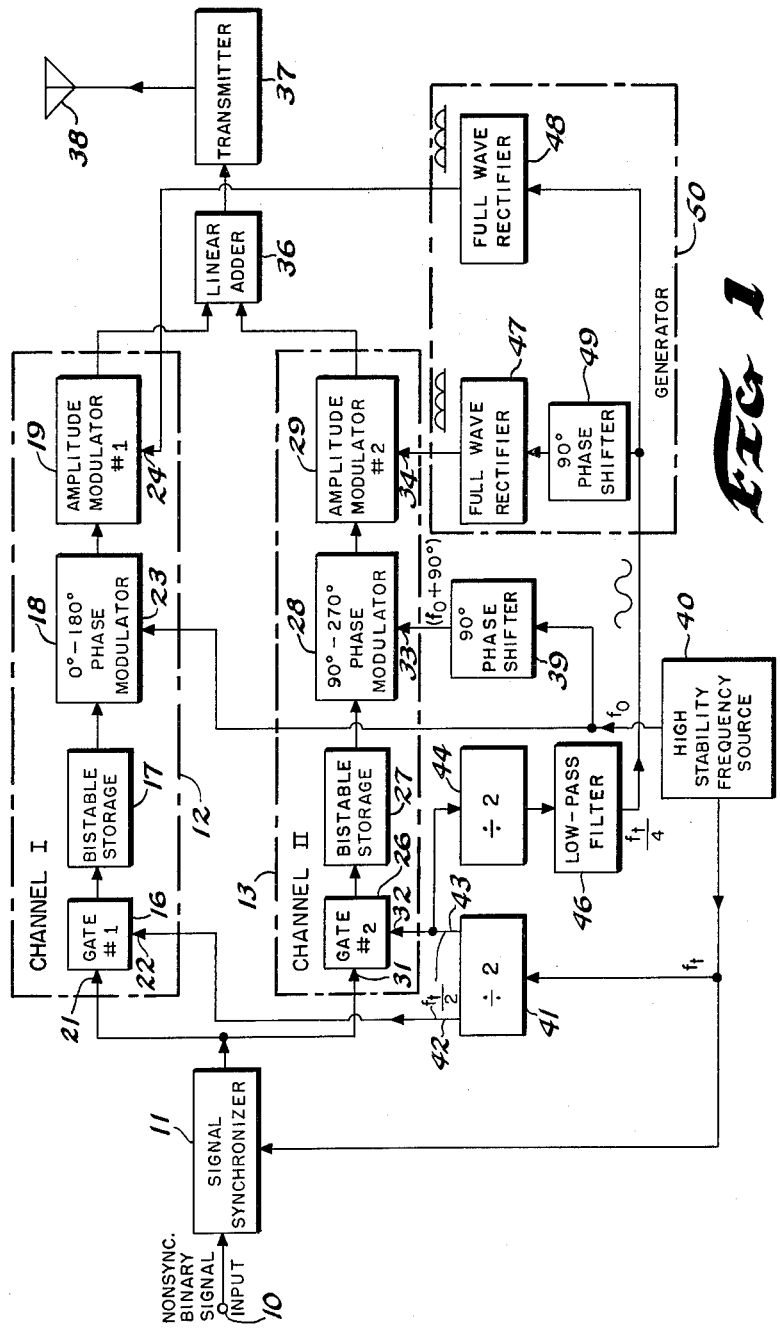

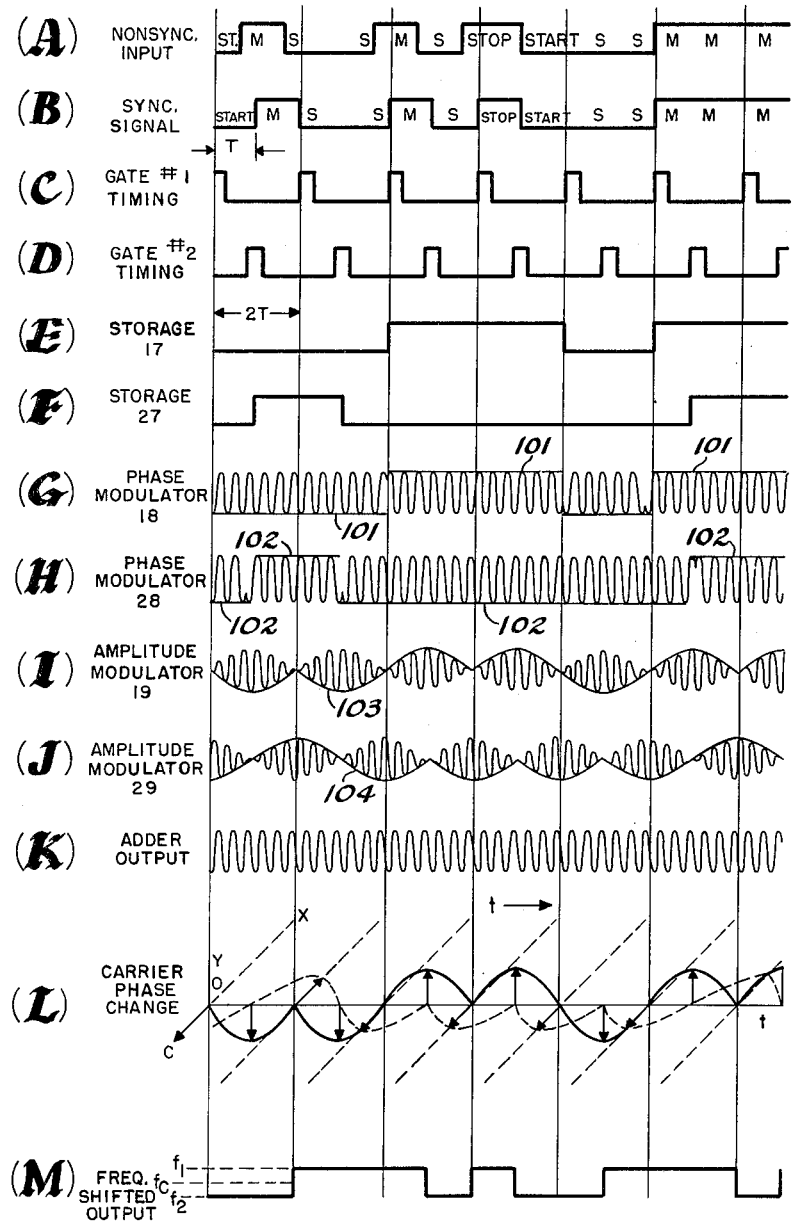

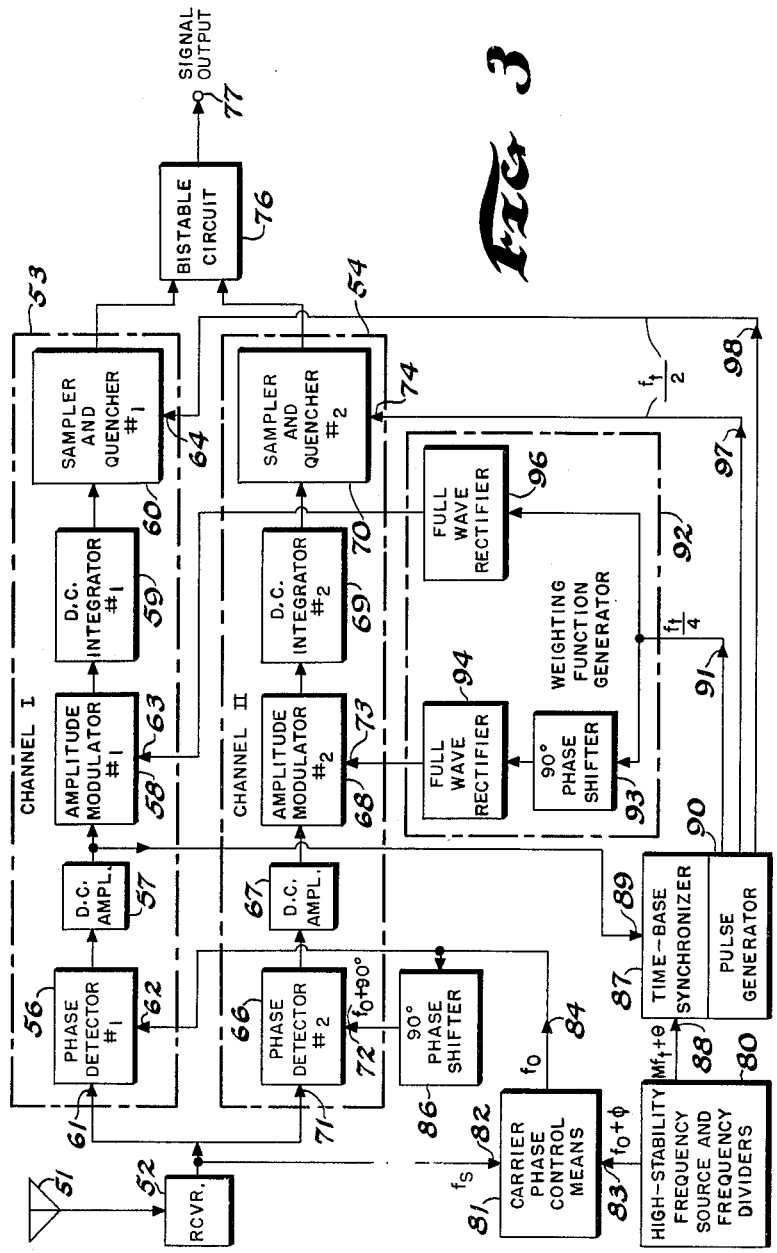

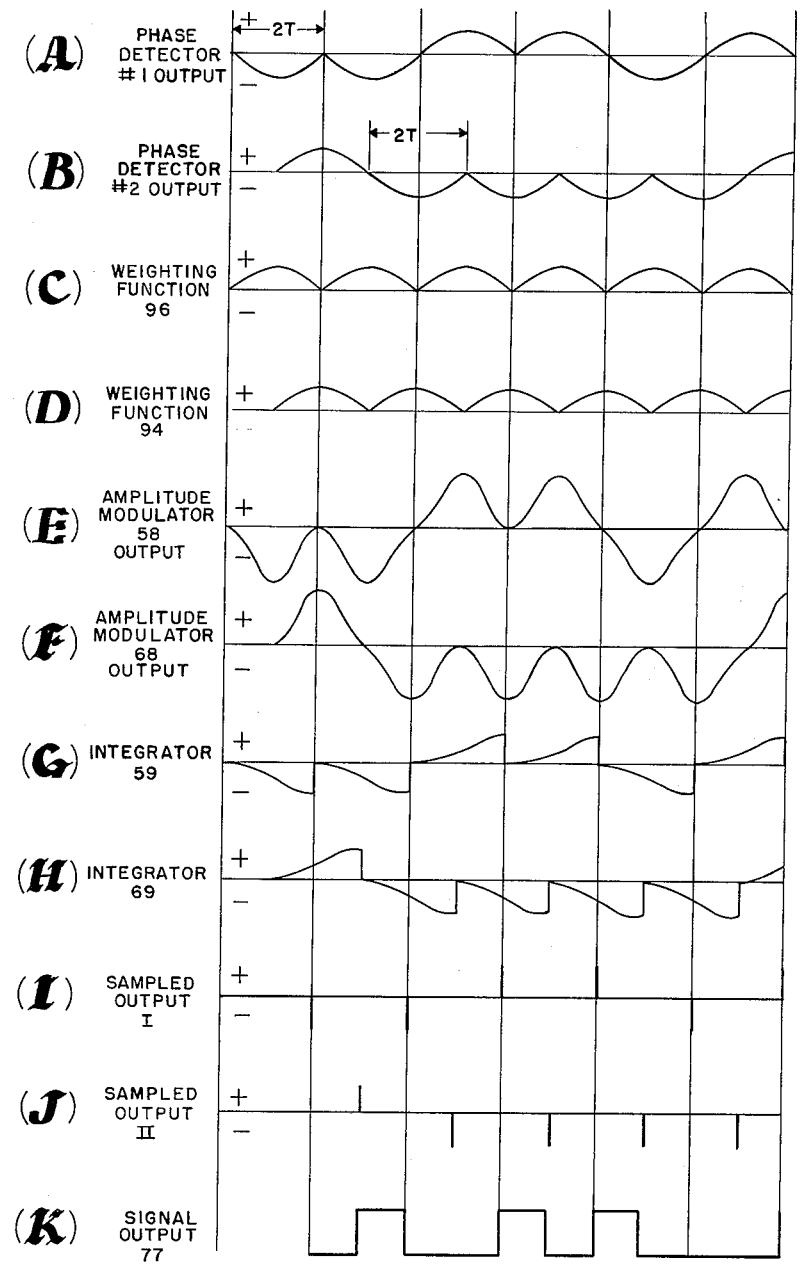

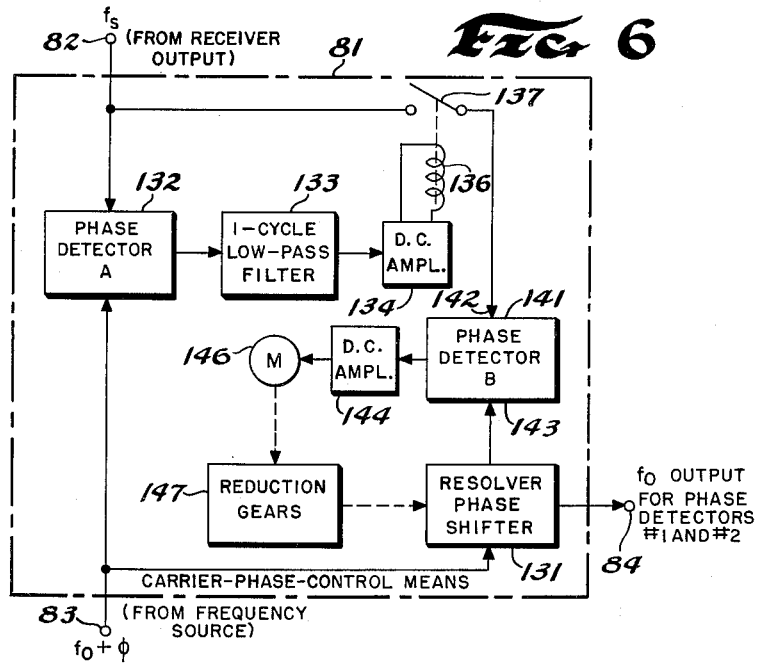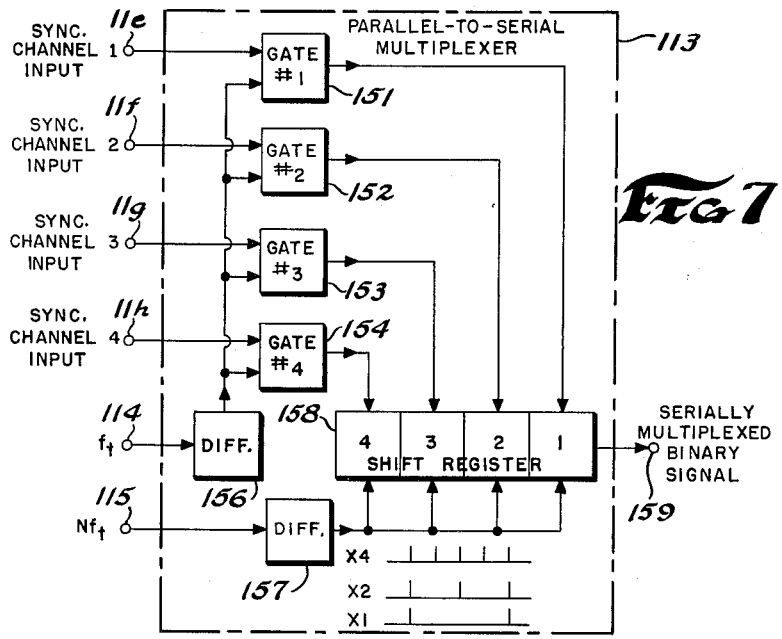

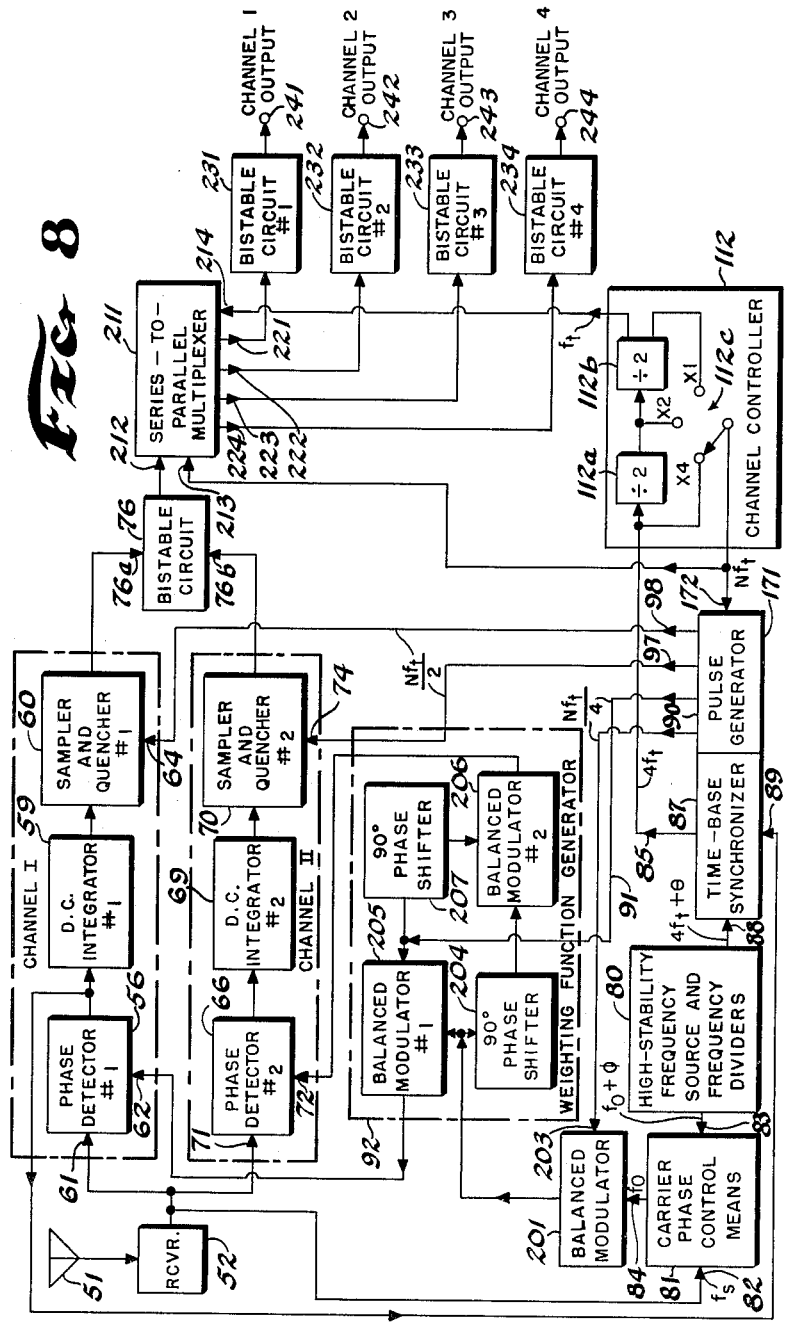

March 28, 1961 M. L. DOELZ ET AL 2,977,417
MINIMUM-SHIFT DATA COMMUNICATION SYSTEM
Filed Aug. 18, 1958 9 Sheets-Sheet 8

INVENTORS
MELVIN L. DOELZ
EARL T. HEALD
BY Moody and Goldman
ATTORNEYS

INVENTORS
MELVIN L. DOELZ
EARL T. HEALD
ATTORNEYS

United States Patent Office 2,977,417
Patented Mar. 28, 1961

2,977,417

MINIMUM-SHIFT DATA COMMUNICATION SYSTEM

Melvin L. Doelz, Northridge, and Earl T. Heald, Canoga Park, Calif., assignors to Collins Radio Company, Cedar Rapids, Iowa, a corporation of Iowa Filed Aug. 18, 1958, Ser. No. 755,740

28 Claims. (Cl. 178—51)

This invention relates generally to binary frequency shift communication systems. In particular, it relates to such systems that minimize frequency shift and transmission bandwidth.

Prior types of frequency-shift keying systems generally utilized a reactance-tube modulator at the transmitter and a detector at the receiver which was either a conventional frequency discriminator or a pair of filters respectively tuned to the mark and space frequencies. The choice of frequency-shift ($\Delta F$) in prior systems was to some extent arbitrary, but was generally controlled by transmitter antenna bandwidth at very low frequencies and at other frequencies by the stabilities of the transmitted wave, of the transmission medium, and of the detector. The choice of amount of frequency-shift ($\Delta F$) accordingly was not related to information rate.

This invention does not utilize the conventional techniques and has neither a reactance-tube type of modulator nor a detector of the discriminator or filter type.

The invention provides a novel system for the generation and detection of frequency-shifted signals, and it relates frequency-shift ($\Delta F$) to information rate ($Nf_t$) according to the expression:

$$\pm \Delta F = \frac{Nf_t}{4} \quad (1)$$

where $f_t$ is the information-rate-per-channel in bits-per-second, $\Delta F$ is in cycles-per-second, and N is the number of channels in a time-multiplexed arrangement. For simplex operation, N is one.

The value of $\Delta F$ obtained by expression (1) obtains a minimum frequency-shift compatible with independence between opposite types of binary information bits (marks and spaces). The minimum-independent frequency-shift is obtained by having each of the shifted frequencies ($F_c + \Delta F$) and ($F_c - \Delta F$) have a phase-change of 90° per-information-bit with respect to the carrier frequency $F_c$. Hence, with respect to the carrier, the phase-change is in opposite sense for mark and space, respectively. The discontinuities caused by the modulation function are minimized by having the shifted-frequency phase changed by 90° per-information-bit. Phase-changes that are integer multiples greater than one of 90° per bit could be used but are not minimum.

The invention uses quadrature-phase separation of simultaneous information components in the transmitted wave. This, in effect, permits a division of the information into two parts that are simultaneously transmitted at one-half rate on the same carrier frequency. Without the quadrature-phase separation, a doubling of the minimum phase-change per bit to a value of 180° per bit would result.

Thus, the invention permits a single channel of 60 words-per-minute teletypewriter information to be obtained with a frequency-shift of plus-or-minus 11¼ cycles-per-second from the center frequency; two such channels are time-multiplexed in plus-or-minus 22½ cycles-per-second of frequency-shift; and $n$ number of such 60 words-per-minute channels can be time-multiplexed in plus-or-minus $n \times 11¼$ cycles-per-second of frequency shift.

Minimization of frequency-shift results in minimization of bandwidth for a given information rate.

The invention requires a degree of phase stability and is capable of transmission through any phase-stable medium at any carrier frequency without the necessity of a transmitted phase reference.

The invention is particularly adaptable to VLF (very low frequency) atmospheric electromagnetic propagation, because of the phase-stable characteristics found in this frequency range for transmissions over thousands of miles. The VLF range generally encompasses frequencies below about 30 kilocycles-per-second.

In practice, severe bandwidth limitations occur with efficient VLF transmitting antennas. High efficiency is required because of the large amounts of power generally carried by such antennas, which may be of the order of a million watts. In many situations, antenna tuning is made to follow a frequency-shifted wave. In such case, tuning must be frequency-shifted with the information, which results in reactance-shift problems. These problems are minimized by the invention, since it minimizes the frequency-shift on which antenna reactance-shift is dependent. Furthermore, with a fixed tuned antenna, a minimum bandwidth communication system is necessary for compatibility with maximum VLF antenna efficiency. Accordingly, the invention provides a system for obtaining optimum efficiency with VLF antennas.

Furthermore, the invention permits the use of class-C amplifiers including its final transmitter amplifiers, which further contribute to maximum transmission efficiency.

When using a single carrier wave, the invention is capable of operating on a single channel basis or on a time-division multiplexed basis by merely changing its internal-timing rate. Time-multiplexing in the invention can be done by first converting the data from a plurality of independent-parallel channels into serially-multiplexed form and by increasing the timing of the entire system by a factor of N, where N is equal to the number of channels.

VLF atmospheric propagation conditions result in atmospheric noise that is extremely variable, and it can have unpredictable amounts of white noise and high-amplitude impulse noise. The presence of large amounts of atmospheric noise requires a detection process that obtains maximum discrimination between signals and noise. The invention obtains such maximum discrimination by utilizing such optimum detection principles as:

(1) Providing long-term local synchronization at both the transmitter and receiver for their heterodyning frequencies and information rates, (2) Separating alternate bits of a binary signal and transmitting them as synchronous time and phase quadrature components, (3) Applying separate weighting-functions to received-signal components at one-half the received information rate, (4) Integrating the received signal components at direct-current level for periods that are twice the period at the information rate. Such doubling of integration time increases the detected signal-to-noise ratio, compared to integration only over the information rate periods.

The modulating portion of the invention receives a synchronous binary signal (which is to be communicated) that has a rate designated herein as the input-information rate. The modulating portion separates alternate information bits of the signal into two separate channels. Each channel then handles one-half of the binary information and does so at the channel-timing rate, which is one-half of the input-information rate. Due to alternate handling of information bits by the two channels, the respective channel-timing rates, although equal, have alternate time-occurrence, resulting in a 90° phase displacement in the synchronization of the two channels.

Each channel includes a phase modulator. It discretely modulates a local carrier (or subcarrier) frequency by 0° or 180° in accordance with the channel's component information. The local carrier frequencies applied to the respective channels are equal in frequency but one is displaced by 90° from the other. Hence, one channel provides discrete phase-modulation of the carrier by 0° or 180°, while the other channel provides discrete phase-modulation by 90° or 270° in response to the component information of the respective channel.

In addition to being phase-modulated, the wave in each channel is amplitude-modulated at the channel timing rate. The amplitude modulation is in synchronism with the respective channel-timing. Hence, the amplitude of each channel output wave is at zero amplitude at the instant that it shifts phase. The amplitude-modulation can be done by amplitude-modulating the phase modulator output or either of its inputs, since an amplitude variation of either input carries through to its output. The phase-and-amplitude modulated signals from both channels are linearly added together; and their combination provides a frequency-shifted signal having the optimum frequency-shift modulation characteristics described above. This signal can be transmitted by conventional class-C means at either the generated carrier-frequency level or after frequency translation.

After the signal is received and amplified, its quadrature components are separated into two separate detection channels by phase detectors provided at the respective inputs to the channels. Each phase detector utilizes a locally-generated frequency which is phase stable with respect to the received carrier. The local frequency is applied to the two phase detectors in separate parts with a 90° phase separation between them. The phase detectors not only separate the signal components but also translate them to direct-current level. Each phase-detector output has polarities which correspond to the alternate bits of information detected by its channel.

The error rate of the received signal is greatly improved by further processing of the outputs of the phase detectors. Thus, noise perturbations may cause instantaneous errors in the polarity of a phase-detector output, even though its average polarity may be correct. Thus, average polarity is used by the invention for final detection rather than instantaneous polarity, because of the much greater chance the average polarity has of being error-free. The improvement in error-rate is obtained by applying a weighting-function to each phase-detector output and then integrating the weighted phase-detector output over its respective channel-timing periods, providing a second weighting function to the signal.

The receiver weighting-functions are like the respective channel amplitude-modulations provided at the transmitter. Due to the fact that the two receiver channels handle alternate bits of information, the separate weighting functions applied to the two channels must be time-separated by 90° of phase. Accordingly, a pair of weighting-functions are applied respectively to the receiver channels in synchronism with their respective information bits. The weighting-functions thus amplitude-modulate the channel signals with their expected amplitude shape. That is, the weighting-function applied to a respective channel has the same amplitude variation known to be transmitted for the respective channel, and it weights the amplitude variations of a given bit by the multiplication process of amplitude-modulation. Such amplitude-modulation is done only with respect to the magnitude of each bit and does not alter its polarity. As a result, each weighted bit has a cosine-squared type of form, with the binary information remaining yet undetected, in its alternating-current components and direct-current polarity.

Integration is then applied to each weighted information bit to average its polarity. At the end of each integration period, the summed polarity is sampled to detect the information received by the respective channel. The signal-to-noise ratio is thus maximized. The integrator is quenched before receiving each new information bit. Integrator quenching can be accomplished either immediately after or at the same time as sampling, so that integration of the next information bit can be done without distortion or influence by the polarity of the preceding bit. Alternate sampled channel outputs provide the detected information, since the alternate bits from the two channels fall into place timewise. A bistable circuit is generally used to shape the signal, and can have its inputs directly connected to the respective outputs of the two channels to receive their time-staggered information components. The output of the bistable circuit is a reconstructed form of the binary signal generally provided to the transmitter modulator.

Further objects, features, advantages, and operations of this invention will become more apparent to a person skilled in the art upon further study of the specification and accompanying drawings in which:

Figure 1 illustrates a form of transmitter portion of the invention;

Figures 2(A) through (M) show waveforms used in explaining the operation of the transmitter portion;

Figure 3 illustrates a form of receiver portion of the invention;

Figures 4(A) through (K) illustrate waveforms used in explaining the receiver portion;

Figure 5 illustrates a modified form of transmitter portion of the invention;

Figures 6 and 7 show in more detail component parts utilizable in the invention;

Figure 8 illustrates a modified form of receiver portion of the invention; and

Figure 9:
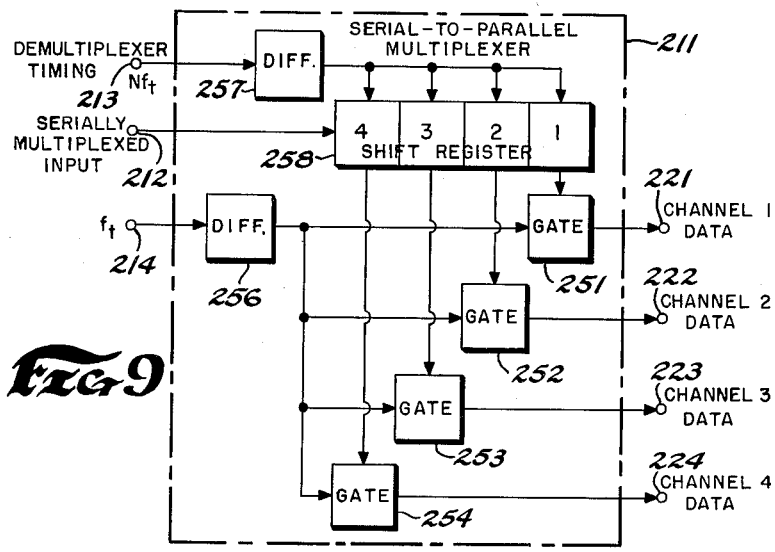

Figures 9, 10, 11, and 12 show in more detail other component parts utilizable in the invention.

The drawings are considered now for a more detailed discussion of the invention. Figure 1 shows a modulator that receives a nonsynchronous binary input signal at a terminal 10. Such a binary input signal may be obtained from an ordinary teletypewriter, for example. Since the invention requires a synchronous input signal, a signal synchronizer 11 synchronizes the bits (bauds) of the received signal with the modulator's timing $f_t$, derived from a high-stability frequency source 40. If the signal is synchronous when applied to terminal 10, synchronizer 11 can be eliminated.

Source 40 may consist of a highly-stable temperature-controlled crystal oscillator of known type. Since a stable crystal frequency may have a high value, such as a megacycle, source 40 includes frequency dividers for dividing down the oscillator frequency to a frequency $f_0$ which is the modulator's carrier frequency, and to the synchronous information rate designated herein as $f_t$ which is provided to synchronizer 11.

Figure 2(A) illustrates a nonsynchronous input signal which may be received at terminal 10; and Figure 2(B) shows the same signal after being synchronized by 11. The common vertical lines in Figure 2 are timing lines which represent like instants of time throughout all of Figures 2(A)–(M).

A pair of modulator channels I and II receive the synchronous input signal at inputs 21 and 31, which are respective inputs of the sampling gates 16 and 26. The gates are enabled during alternate periods of the input signal, so that each passes alternate bits of the signal. The alternate timing of the gates is obtained from channel-timing waves applied at their inputs 22 and 32 respectively. The timing waves are generated by a bistable-divider 41, which has an input connected to the $f_t$ output of source 40. Hence, the two outputs 42 and 43 of divider 41 are oppositely phased, and accordingly each has a repetition rate of $$\frac{f_t}{2}$$

which is the channel-timing rate. The opposite outputs of divider 41 can be provided through differentiating circuits (not shown) of well-known type to provide the sampling pulses shown in Figures 2(C) and 2(D), respectively.

In Figure 1, a pair of bistable-storage circuits 17 and 27, which might be flip-flops, respectively receive the outputs of gates 16 and 26. The storage circuits are triggered to voltage levels corresponding to that of alternate sampled information bits passed by their respective gates. Circuits 17 and 27 each store their received information for periods of 2T. Figure 2(E) illustrates a typical output of storage circuit 17; while Figure 2(F) illustrates a typical output of storage circuit 27, as they operate with respect to the data shown in Figure 2(B).

A pair of phase modulators 18 and 28 in Figure 1 have inputs respectively connected to the outputs of bistable-storage circuits 17 and 27. Other inputs 23 and 33 of the phase modulators receive a carrier (or subcarrier) frequency $f_o$ derived from frequency source 40. Frequency $f_o$ is applied directly to modulator 18; but it is shifted in phase by 90° by a phase shifter 39 before being applied to modulator 28. Each phase modulator is capable of discretely shifting its output phase by either 0° or 180° to correlate with the data received from its bistable-storage circuit 17 or 27. Such phase modulators can be of the balance-modulator type. If frequency $f_o$ has a zero reference phase when received by modulator 18, the modulator output will have a phase of either 0° or 180° with respect to $f_o$. On the other hand, with the phase of $f_o$ being shifted 90° before being applied to modulator 28, its output will have a phase of either 90° or 270° with respect to the reference phase of wave $f_o$.

Figure 2(G) represents the phase-modulated output of modulator 18, wherein lines 101 are drawn to represent the phase of the wave. When the line 101 is above the wave, a 0° phase is represented; and when line 101 is below the wave, a 180° phase is represented. The correlation between the discrete phasing of the wave in Figure 2(G) and the polarity of the wave in Figure 2(E) is immediately evident.

Similarly, Figure 2(H) illustrates the phase-modulated output of modulator 28, with a 90° phase being represented by a line 102 above the wave, and a 270° phase being represented by a line 102 below the wave. In a like manner, the phase of the wave in Figure 2(H) corresponds to the polarity of the wave in Figure 2(F).

Before the phase-modulated wave leaves a respective channel in Figure 1, an amplitude modulation is applied to it. The amplitude variation has a sine distribution over each channel-period 2T; wherein the amplitude of the wave periodically becomes zero, with phase transitions occurring during instances that the wave has zero amplitude. The amplitude modulation is derived from a generator 50 that receives a sine-wave that has a frequency $$\frac{f_t}{4}$$

This sine-wave is obtained by connecting the input of a binary-frequency divider 44 to output 43 of divider 41, and passing the output of divider 44 through a low-pass filter 46 to obtain the sine-wave fundamental frequency. The sine-wave is full-wave rectified by circuits 47 and 48 before being used to amplitude modulate the channel waves. However, the sine-wave is phase-shifted by 90° by shifter 49 before being rectified for use with channel II. The rectified waves each have the channel-timing rate $$\frac{f_t}{2}$$

Amplitude modulators 19 and 29 are conventional and respectively receive the outputs of phase modulators 18 and 28. The direct-current components of the rectified waves are maintained to insure that the amplitude of each modulated wave goes to zero at the instants of discontinuity of the respective rectified wave.

Figure 2(I) shows the output of amplitude modulator 19; and Figure 2(J) shows the output of amplitude modulator 29. The 90° channel-timing displacement will be noted between Figures 2(I) and (J). The two modulated phases in Figure 2(I) are represented by solid lines 103 in the same manner as shown in Figure 2(G) by lines 101. Similarly, lines 104 represent the two modulated phases in Figure 2(J) to correspond to the phases represented in Figure 2(H).

In Figure 1, a linear adder 36, which may be nothing more than a linear resistor, receives the outputs from channels I and II and linearly combines them to provide a resultant frequency-shifted wave having a constant amplitude as illustrated in Figure 2(K). The modulation variation of the output wave in Figure 2(K) is analyzed in Figure 2(L); wherein the instantaneous phase of the wave relative to the carrier phase is represented by the angular position of a rotating vector that moves to the right as a function of time. This vector rotates either in a clockwise or counterclockwise direction in response to the modulation, and it is always parallel to the x—y plane. Its rotational directions represent the two respective frequencies in the frequency-shifted output. Hence, the phase of the rotating vector is relative to a "fixed phase" nonrotating carrier vector C in Figure 2(L). The frequency of the output wave represented by Figures 2(K) and 2(L) shifts in the manner shown in Figure 2(M). Note that the frequency transitions occur at the instances of reversal in direction of rotation by the modulation vector in Figure 2(L).

A transmitter 37 receives the frequency-shifted output of linear adder 36 and transfers it to an antenna 38 for electromagnetic-wave transmission. Transmitter 37 may be a class-C amplifier connected to a VLF antenna 38. However, conventional heterodyning means can be utilized in transmitter 37 to provide the output from antenna 38 at any desired carrier frequency.

It will be noted by comparing Figures 2(M) and 2(B) that the frequency-shifts of the output wave do not directly correspond to the polarity shifts of the binary input signal, as is found in conventional types of frequency-shift-keying transmissions. Yet all of the binary information of the input wave of Figure 2(B) is included in the output wave represented by Figure 2(M).

Figure 3 shows a system for detecting a received frequency-shifted wave of the type represented in Figure 2(M). It includes an antenna 51 connected to a receiver 52. In a VLF system, receiver 52 can be primarily a selectivity and gain-controlled amplifying device, which provides an output signal having the same frequency-characteristics as the received wave. Where the transmitted wave is at a high frequency level, receiver 52 may include conventional heterodyning means for translating the frequency down to a required level. Where such heterodyning means is included, it should be phase-stable with respect to the received wave.

In the examples of this specification, it is presumed that a VLF wave is used and that receiver 52 does no heterodyning prior to detection.

Accordingly, the receiver output will have the same frequency and phase characteristics as the transmitted VLF signal, excluding noise effects.

The detection process of the receiver requires phase-stable heterodyning by a locally-derived frequency $f_o$, which retains a phase-lock with the carrier-frequency component of the received wave. Such phase-lock is obtained by means of a carrier-phase-control means 81. A high-stability frequency source 80 includes frequency divider means to provide control means 81 with a local frequency $(f_o+\phi)$, where $\phi$ is an arbitrary phase-error. Source 80 may have a stability of one part in $10^8$ per day which is well known in the art. The purpose of control means 81 is to eliminate the phase-error $\phi$. Thus, control means 81 phase shifts the source signal $(f_o+\phi)$ in a manner which eliminates phase error $\phi$, thus providing output $f_o$ which has phase-lock with the carrier component of the received signal. One detailed form of carrier-phase-control means 81 is discussed below, regarding Figure 6.

The detecting portion of the invention includes a pair of channels I and II, which are the counterparts of channels I and II of the transmitter portion of the system. The channels respectively include phase detectors 56 and 66, each having respective inputs 61 and 71 connected to the output of receiver 52. Frequency $f_o$ is directly injected at input 62 of phase detector 56; and frequency $(f_o+90°)$ is injected at input 72 of phase detector 66 from a phase shifter 86. The quadrature separation of these frequencies in conjunction with their phase-lock enables them to separate the quadrature components of the received signal into channel I and channel II respectively. Consequently, the outputs of the respective phase detectors in Figure 3 have polarities which correspond to alternate bits of information handled by the respective channels of the modulator in Figure 1. Figures 4 (A) and (B) illustrate the respective outputs of phase detectors 56 and 66.

The phase-detector outputs theoretically contain all of the information of the received wave and, if it were not for momentary noise errors, could be combined by alternate polarity sampling to provide a signal having the information of the modulator signal in Figure 2(B). Hence, the theoretically-perfect waveforms given in Figures 4(A) and (B) will in practice suffer distortions due to atmospheric and receiver noises. In such case, direct short-time samplings of the phase-detector outputs may result in a high error rate. A more error free determination of the information is given by the average polarity over each bit (baud) period 2T. Accordingly, integration is used to obtain polarity averaging over each channel period, 2T, to improve the reliability of the detection process. A still further improvement in detection reliability is obtained by applying a weighting function to the received signal components in each of the channels prior to integration. The weighting function in effect gives cognizance to the known-amplitude form of the transmitted signal components, which have a sine-distribution over any single channel period, 2T. After applying the weighting function, the wave in each channel has a sine-squared form over any respective channel period 2T.

Hence, the integration of the wave is done after the weighting function is applied. The reliability of the integrated polarity is optimum at the end of integration period, 2T. Accordingly, the polarity is sampled at the end of each period 2T; and the integrator is quenched, that is, discharged to zero value, so that the integrator is ready to receive the following information bit. The polarity of the samplings contains the detected information and can be used to reconstruct the original modulator signal.

In more detail, the weighting functions are applied in Figure 3 to the phase-detector outputs by amplitude modulators 58 and 68 after direct-current amplification by amplifiers 57 and 67, respectively. The weighting functions are generated from a sine-wave having a frequency $$\frac{f_t}{4}$$

derived from a pulse generator 90.

A weighting-function generator 92, similar to generator 50 in Figure 1, includes a full-wave rectifier 96 which receives the $$\frac{f_t}{4}$$

wave and rectifies it to provide the wave shown in Figure 4(C).

A time-base synchronizer 87 phase-locks the discontinuities of the weighting-function wave in Figures 4(C) and 4(D) with the transitions of their respective phase-detector outputs. Accordingly, the output of each amplitude modulator 58 and 68 has the sine-squared form shown in Figures 4(E) and 4(F).

Input 88 of time-base synchronizer 87 receives a frequency $Mf_t+\theta$ from frequency source 80, where M is any integer and $\theta$ is an arbitrary phase-error. The synchronizer 87 removes phase-error $\theta$ and therefore synchronizes frequency $Mf_t$ with the modulation transitions of the received signal. Synchronizer 87 thus has an input 89 connected to the output of amplifier 57 to receive one of the phase-detector outputs from which the transitions of the signal are recognized. Actually, the output of either phase detector can be utilized as a reference.

Means is included within pulse generator 90 for dividing the frequency of the synchronized wave received from synchronizer 87 to provide an output sine-wave 91 having a frequency $$\frac{f_t}{4}$$

which corresponds to a period of 4T. Thus, each half cycle of output wave 91 has a half period of 2T, which is translated to a full period by rectification.

Since the information transitions in channel II occur midway between the alternate information transitions in channel I, the weighting functions applied to channels I and II must be similarly displaced. Thus, a 90° phase shift is provided for wave $$\frac{f_t}{4}$$

by a shifter 93 that is followed by a full-wave rectifier 94. It provides the weighting-function to modulator 68 of channel II as shown in Figure 4(D). Hence, the output of modulator 68 has a cosine-squared amplitude distribution, such as shown in Figure 4(F).

Direct-current integrators 59 and 69 respectively receive the weighted phase-detector outputs, and the integrators may be conventional R-C types of circuits. The integrated functions are shown in Figures 4(G) and (H).

Sampling and quenching circuits 60 and 70 are respectively connected to the integrator outputs. At the end of each channel period 2T, each circuit 60 and 70 respectively samples the polarity of its integrator circuit, and quenches it by discharging its energy back to approximately a quiescent or zero condition. The sampling and quenching can be done separately with the sampling occurring slightly before quenching, or can be done simultaneously. Circuitry simplification is generally obtained with simultaneous sampling and quenching. This will be discussed in more detail below in connection with Figure 11.

Due to the staggered operation (90° phasing) of the two channels, sampling is alternately timed for the two channels by short-duration pulses phased with the ends of the integration periods. Although each of the sampling-timing pulses have the same polarity, they have the channel-timing rate of $$\frac{f_t}{2}$$

shown by Figures 4(I) and (J), which show the sampled outputs from channels I and II. The channel timing pulses are provided by outputs 97 and 98 of pulse generator 90, explained in more detail below in connection with Figure 10.

A bistable circuit 76 is connected to the sampled outputs of the two channels and has its output state triggered to a level corresponding to the polarity of the pulses, as shown by Figure 4(K). Consequently, bistable circuit 76 alternately receives the sampling pulses shown in Figures 4(I) and 4(J) and is sequentially triggerable by them. Such sequential triggering reconstructs the original binary modulating signal which is provided to output terminal 77. This output signal may be amplified to drive a teletypewriter, so that printed copy can be directly obtained. Thus, the output signal of Figure 4(K) provided at terminal 77 corresponds to the modulator signal of Figure 2(B).

The described system presumes that a very-high degree of frequency and phase stability is obtained during the heterodyning operations at both the transmitting and receiving portions of the system, and also during propagation, which is, for example, easily obtainable under VLF propagation conditions. For example, when the transmitter and receiver local frequency sources have a stability of one part in $10^9$ per day and transmission is at the VLF frequency of 20 kilocycles-per-second, a maximum phase-drift of 3.5 cycles-per-day is caused at the receiver. Adequate system operation can easily be obtained with this order of phase error. Under such circumstances, it is necessary to phase synchronize the system every fifteen minutes, if the transmitter and receiver are located at stationary positions on the earth. Where they move relative to one another, means is necessary to account for doppler shift due to radial velocity and for changes of radial distance. It will be presumed in the specification for the sake of maximum simplicity that the transmitting and receiving stations are stationary and that an unmodulated carrier wave at frequency $f_0$ is transmitted for short periods at intervals of about fifteen minutes. Whenever such synchronizing signal is transmitted, the carrier-phase control means of Figure 6 automatically operates to synchronize the receiver's locally-generated heterodyning signal. Other synchronization means (not given herein) has been conceived for operating continuously from the received signal, eliminating the necessity for a special synchronization signal.

Figure 6 illustrates one form of carrier-phase-control means 81, which corrects for the phase error $\phi$ of the receiver's local source 80. Thus, in Figure 6, a phase detector 132 has one input connected to terminal 82 to directly receive the output of receiver 52. Another input 83 of detector 132 receives the error-containing output $(f_0+\phi)$ from frequency source 80.

Since such transmitted synchronizing frequency $(f_0)$ and the local frequency $(f_0+\phi)$ have only a small difference due to $\phi$, a low-pass filter 133 connected to the output of the phase detector can have a very low cutoff frequency such as one cycle-per-second or less in order to pass their detected difference. Thus, whenever a synchronizing frequency is sent, it is recognized by the energization of a relay 136 connected to filter 133 through a direct-current amplifier 134. Due to the long time-constant of filter 133, relay contacts 137 are closed only when a synchronizing signal is received for a period of at least a second. Because of the narrow-band of filter 133, contacts 137 are not closed by noise or stray signals. A resolver-type phase-shifter 131 in Figure 6 receives the locally-generated frequency $(f_0+\phi)$ and phase shifts it by $-\phi$ so that its phase error is eliminated. The resolver's phase-corrected output is provided to a terminal 84 and is utilized for receiver heterodyning. A servo system operates resolver 131 and includes a phase detector 141 that has an input 143 which receives the resolver output. Another input 142 receives the synchronizing frequency from contact 137 whenever it is closed. A direct-current amplifier 144 amplifies the output of phase detector 141 and drives a direct-current motor 146. A set of reduction gears 147 is connected between the output of the motor and the mechanical input of resolver 131. Consequently, the resolver is rotated by the motor until phase detector 141 finds a null which occurs when a phase-lock exists between the two inputs to phase-detector 141. A resolver-type phase shifter provides a permanent memory in that it retains its phase setting as long as motor 146 is not energized.

Figure 10:
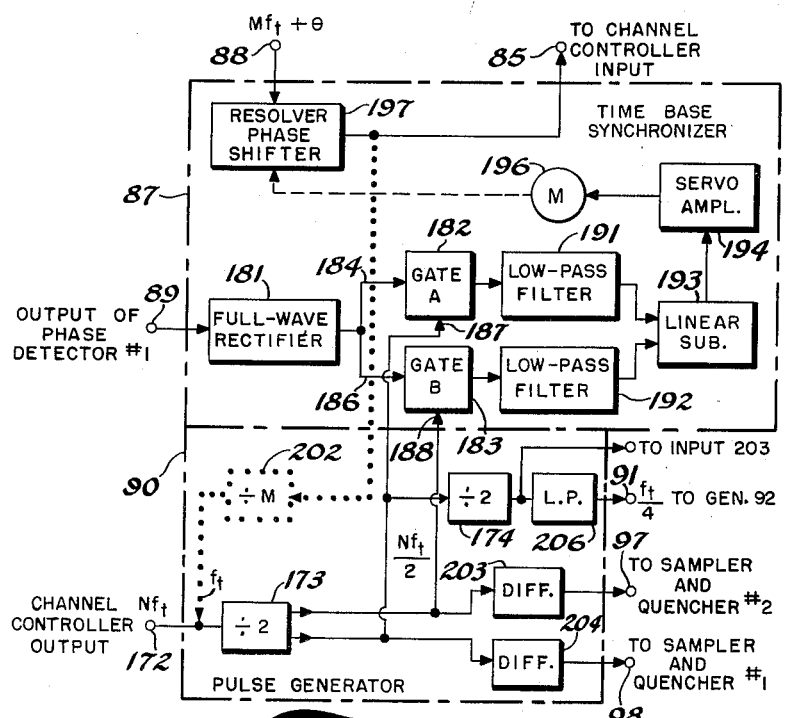

Figure 10 illustrates a detailed form of time-base synchronizer 87 and pulse generator 90. The synchronization operations of control means 81 and synchronizer 87 differ in that the former synchronizes the heterodyning frequency, while the latter synchronizes the pulse timing of the detector and is less exacting than the former because a much lower frequency is involved. In synchronizer 87, another form of servo system is used which also uses a resolver-type phase-shifter 197 that is connected to input terminal 88 to receive an output frequency $Mf_t+\theta$ from source 80, where M is any positive integer. Here, the servo regulates resolver 197 to provide a phase shift of $(-\theta)$ so that the output of the resolver has the phase corrected value $Mf_t$.

The portions shown in dotted lines in Figure 10 are included in the receiving system of Figure 3 but not in the later described system of Figure 8. Thus, in Figure 3 the output of resolver 197 is frequency divided by integer M in a frequency divider 202 to provide frequency $f_t$ to pulse generator 90. Terminals 172 and 85 are not used in the system of Figure 3, but are used later in Figure 8.

In synchronizer 87, a full-wave rectifier 181 is connected to terminal 89 to receive the output of one of the phase detectors such as 56. Rectifier 181 does not have any output filter; and accordingly its output has a waveform like that of the amplitude-function shown in Figure 4(C). However, the periodic discontinuities of the rectified wave will be dependent on the timing of the transitions of the incoming signal. A pair of gates 182 and 183 have inputs 184 and 186 that receive the output of rectifier 181. The gates also have another pair of inputs 187 and 188 respectively connected to the opposite-phased outputs of divider 173. Thus, the gates open and close alternately with a timing dependent upon the setting of resolver 197.

When resolver 197 is properly adjusted, the switching of gates 182 and 183 occurs at the instants of transition for the rectified phase-detector output. With such phasing, gates 182 and 183 pass alternate and identically-formed rectified half-cycles, which accordingly have equal direct-current values. A pair of low-pass filters 191 and 192 receive the respective outputs of the gates and pass their direct-current components to a linear subtracter 193, which may be nothing more than a pair of resistors on which the signals are made to oppose each other. Hence, when resolver 197 is properly adjusted, a null is obtained from subtracter 193.

When resolver 197 is not properly adjusted, subtracter 193 provides a direct-current output having a polarity dependent on the direction of misadjustment. A servo amplifier 194 receives the output of subtracter 193 and drives a motor 196, which properly adjusts the setting of resolver 197 until a null is provided by subtracter 193 that shuts off motor 196 and leaves resolver 197 in its proper position.

Pulse generator 90 in Figure 10 includes a binary divider 173 that receives frequency $f_t$ from divider 202 and provides opposite-phased outputs, each having a rate of $$\frac{f_t}{2}$$

(The value of N in Figure 10 is one for the receiving system of Figure 3.) Outputs 97 and 98 of generator 90 are obtained by passing the opposite outputs of divider 173 through differentiation circuits 203 and 204 which generate interleaved timing pulses occurring at the respective times given in Figures 4(I) and (J).

The sine-wave output 91 of generator 90 is obtained from a low-pass filter 206 and binary divider 174 connected to one of the outputs of divider 173.

The communication system in Figures 1 and 3 has been explained with respect to a single channel of binary data. However, it can also be easily adapted to handle a plurality of channels on a time-multiplexed basis. Where the same information rate $f_t$ is used for each channel (such as a 60 words-per-minute rate), it is necessary to correspondingly increase the rate of the time-multiplexed wave to $Nf$, where N is the number of channels.

Figures 5 and 8 illustrate a version of the invention which can be simply adjusted to operate at different time-multiplexed rates.

The over-all operation of the system of Figures 5 and 8 remains basically similar to that of the system of Figures 1 and 3. Nevertheless, certain structural differences occur in the system of Figures 5 and 8 which obtain practical advantages, and which could also have been provided in the single-channel system of Figures 1 and 3. The changed features regard the direct-current stability problem found in the use of full-wave rectification in Figures 1 and 3 to operate the amplitude modulators. The system of Figures 5 and 8 eliminates the need for such direct-current stability by obtaining the weighting-function modulation in a different manner.

Figure 5 illustrates a modulator which can handle simultaneously either one, two or four ($2^n$) independent channels. For example, up to four different conventional teletypewriter outputs may be connected to input terminals $10a$, $10b$, $10c$, and $10d$. Signal synchronizers $11a$ through $11d$ convert the rates of the respective signals to synchronous rate $f_t$. A parallel-to-serial multiplexer 113 receives the outputs $11e$ through $11h$ of the signal synchronizers and translates them into time-multiplexed form. It receives a pair of timing inputs 114 and 115 having pulsing rates $f_t$ and $Nf_t$ respectively. Thus, the output rate of multiplexer 113 is $Nf_t$; and the multiplexed signal is binary; that is, it has either of two voltage levels at any one time. Multiplexer 113 will be discussed in more detail later.

A high-stability frequency source 40, of the same type as described for Figure 1, controls the stability of the system in Figure 5 and provides an output frequency $4f_t$ (M is four in Figure 5) from internal frequency dividers (not shown). A channel controller 112 receives frequency $4f_t$ and includes a pair of binary dividers $112a$ and $112b$. The frequency $f_t$ is provided from divider $112b$. A switch $112c$ in the controller has a single pole and three contacts respectively connected to the input of divider $112a$ and to the outputs of dividers $112a$ and $112b$. Thus, the setting of switch $112c$ provides the multiplex timing rate $Nf_t$ where N may be either one, two or four.

A binary divider 41 has its input connected to the pole of switch $112c$ and provides a pair of opposite-phased outputs 42 and 43, each having a pulsing rate of $$\frac{Nf_t}{2}$$

Outputs 42 and 43 are provided to gates 16 and 26 of channels I and II to alternately enable them.

A polarity alternator 116 is connected between the output of multiplexer 113 and the inputs of channels I and II. Alternator 116 inverts the polarity of every other pair of information-bit received. The polarity alternations are for purposes which will be explained later.

Channels I and II in Figure 5 are basically the same as in Figure 1, although they are constructed somewhat differently. Bistable-storage devices 17 and 27 may be flip-flop circuits as in Figure 1 and are connected to the outputs of gates 16 and 26. Hence, they have the same purpose as in Figure 1, which is to store alternate information bits for staggered periods of 2T. A pair of phase modulators 18 and 28 respectively receive the data outputs of storage circuits 17 and 27 which modulate the output phases correspondingly, as also was done in Figure 1.

The amplitude functions in Figures 5 and 8 are generated in a different manner than Figures 1 and 3. In Figure 5, it is applied to channels I and II by modulating inputs 23 and 33 of the phase modulators. That is, the carrier-frequency components applied to the phase modulators are amplitude-modulated according to the weighting function. The amplitude variations of these inputs carry through to the output of the phase modulators.

In Figure 5, the amplitude modulation of the weighting function is done by a pair of balanced modulators 117 and 122. These balanced modulators receive their modulating inputs from a low-pass filter 108 which passes a sine-wave at frequency $$\frac{Nf_t}{4}$$

which is received in square-wave form from a binary divider 107 connected to an output of divider 41.

Thus, input 118 of modulator 117 is directly connected to the output of filter 108. However, input 124 of modulator 122 is phase-shifted 90° by a shifter 121. Frequency $f_o$ from source 40 is applied directly to input 119 of modulator 117 but is phase shifted 90° by item 125 before being applied to input 123 of modulator 122. Accordingly, the outputs of balanced modulators 117 and 122 provide the weighting function in a staggered manner. Each half cycle of modulating wave $$\frac{Nf_t}{4}$$

provides the modulated weighting function with a period of 2T.

However, the opposite polarity of the alternate half-cycles of the sine-wave from filter 108 switches the output phase of each balanced modulator alternate by 180° inversions. This undesired alternate phase inversion, however, is compensated by polarity alternator 116. That is, every time the low-pass filter output goes through a negative half-cycle that causes a phase reversal, alternator 116 at the same time reverses the polarity of the binary-signal input to cause a second simultaneous phase reversal for the phase-modulator outputs. The double reversal totaling 360° results in the same output phase from the phase modulators, as if there had been no phase reversals at all.

Since no direct-current component is involved in the operation of the balanced modulators, there is hence no direct-current instability problem in the generation of the weighting functions of Figure 5. Linear adder 36 receives the output of phase modulators 18 and 28 in Figure 5 and combines them for transmission in the same manner as was done in Figure 1.

Figure 12:
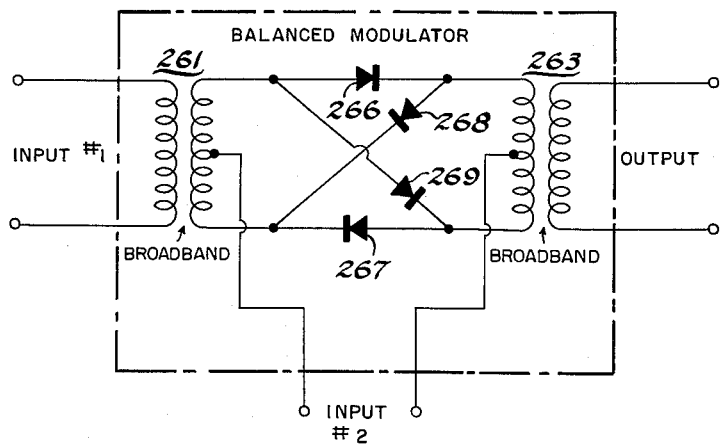

The same type of balanced-modulator circuit can be used for phase modulators 18 and 28, and alternator 116, as well as for modulators 117 and 122. The different titles given these items better illustrate their operating functions. Many different varieties of balanced modulator are known, and one conventional type which may be used for each of these items is shown in Figure 12. It has four diodes 266 through 269 arranged in conventional form. Input #1 is provided through a broadband transformer 261; and input #2 is directly coupled. The output is obtained from a broadband transformer 263. For balanced modulators 117 and 122 and for phase modulators 18 and 28, input #1 receives carrier frequency $f_o$ and input #2 receives sine-wave $$\frac{Nf_t}{4}$$

or the data, respectively. For alternator 116, input #2 receives the data and input #1 receives the square-wave $$\frac{Nf_t}{2}$$

Multiplexer 113 of Figure 5 is illustrated in more detail in Figure 7. It includes four gates 151 through 154, each having an input connected to a respective output 11e through 11h of the signal synchronizers. The other input of each gate is connected to the output of a differentiator 156 which receives the fixed timing $f_t$ from the controller 112. The differentiator merely converts the square-wave form from controller 112 into a short duty-cycle wave, so that the synchronous input signals are sampled during their midportions by gates 151 through 154. A four-section shift register 158, which can be conventional, has the data inputs of its respective sections connected to the outputs of the respective gates, with gate 151 being connected to the section nearest to output terminal 159. Advancing-pulses at the $Nf_t$ rate are provided to all sections from a differentiator 157 which is connected to terminal 115, that receives a square-wave from controller switch 112c having a repetition rate $Nf_t$.

Due to the order of data connection shown in Figure 7, if a single channel is to be used, it should be connected to the channel I terminal; if two channels are to be used, they should be connected to terminals 11e and f; and if all four channels are to be used, they are connected to all terminals. Of course, if only three channels are used, either terminal 11g or 11h may be left unconnected.

Figure 8 illustrates a system for detecting the VLF multiplexed wave provided from the transmitter of Figure 5.

Many of the component parts of Figure 8 are the same as in Figure 3, and these are given like reference numerals. Thus, in Figure 8, the wave is received by antenna 51, and receiver 52 selects and amplifies the received signal. High-stability frequency source 80 with its frequency dividers is provided and can be of the same type as in Figure 3. Similarly, carrier-phase control means 81 has inputs 83 and 82 connected to source 80 and receiver 52. Thus, control means 81 provides an output 84 at frequency $f_o$, which is used by the system in Figure 8 for the same purposes as in Figure 3.

Also, in Figure 8, time-base synchronizer 87 and pulse generator 90 may be the same as those in Figure 3, and accordingly they may be constructed as shown in Figure 10. However, in adapting the structure of Figure 10 into the system of Figure 8, the portions shown in dotted lines in Figure 10 are not utilized but terminals 85 and 172 are used instead. Hence, in Figure 8, output terminal 85 of synchronizer 87 provides a phase-corrected frequency $4f_t$ (M is four for Figure 8) to controller 112, which is the same as controller 112 at the transmitter in Figure 5. The output of controller switch 112c is provided to input 172 of pulse generator 90. Hence, the channel controller in effect replaces the dotted line portions in Figure 10 to adapt it for use in Figure 8.

The weighting function in Figure 8 is generated by means of balanced modulators, as was done in the transmitter system of Figure 5, to similarly avoid direct-current instability problems. In order to alleviate the 180° phase-shifts alternately caused by balanced-modulator operation, an initial balanced modulator 201 is provided to alternately phase-shift frequency $f_o$ by 180° to compensate for later alternate 180° phase-shifts obtained in weighting-function generator 92 in Figure 8. To do this, modulator 201 receives a square-wave input 203 from divider 174 of pulse generator 90 to cause the compensating 180° phase-shifts. Input 203 has a repetition rate $$\frac{Nf_t}{4}$$

which has the same frequency and phase as the sine wave $$\frac{Nf_t}{4}$$

applied to weighting-function generator 90, because they are both derived from the same source, divider 174 in Figure 10. A square-wave is used at input 203 to avoid amplitude-modulation of frequency $f_o$, which is done in weighting-function generator 92. Consequently, balanced-modulator 201 provides a wave which is phase-shifted by 180° at alternate periods 2T but which has no disturbing amplitude variation.

In the weighting-function generator, the output of balanced-modulator 201 is processed for both channels. It is provided directly through a balanced-modulator 205 to input 62 of channel I and, after a 90° fixed phase-shift to frequency $f_o$ by shifter 204, through balanced-modulator 206 to channel II. Thus, modulators 205 and 206 receive the $$\frac{Nf_t}{4}$$

sine-wave from output 91 of generator 90 to generate the weighting-functions, although this sine-wave is shifted 90° by shifter 207 prior to reception by modulator 206. The alternate 180° phase-shifts caused by the sine-wave are hence compensated by initial modulator 201; and therefore no 180° phase inversions occur for the amplitude-modulated wave injected into channel I. Thus, there are two types of phase differences between the heterodyning waves received by channel I phase detector 56 and channel II phase detector 66 in Figure 8. These are: (1) a 90° phase difference between their component frequencies $f_o$, and (2) a 90° phase difference between their weighting-function envelopes.

The phase detectors each heterodyne the received signal to direct-current level with alternating components and separate it into channel I and channel II component data having staggered periods 2T. The weighting-functions are imposed on the signal by the internal operation of the phase detectors; wherein the amplitude-modulation of input $f_o$ is imposed on the heterodyned signal.

Direct-current amplifiers (not shown in Figure 8) would generally be provided at the outputs of phase detectors.

Direct-current integrators 59 and 69 receive the outputs of the phase detectors and integrate them over their periods 2T. Sampler and quenchers 60 and 70 are respectively connected to the integrators, and they sample the polarity of the integration at the end of each period 2T and at the same time discharge the integrators to substantially zero level.

Figure 11:
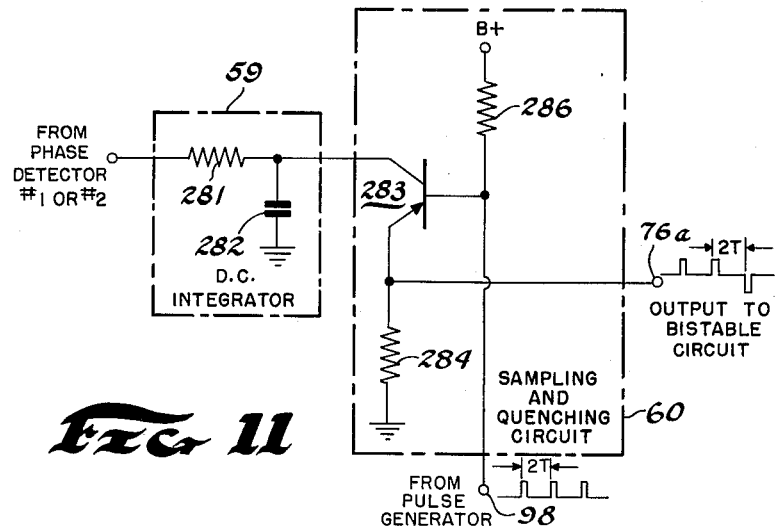

One form of integrator 59 and sampler and quencher 60 is shown in Figure 11. Items 69 and 70 can be the same. This form can be used in the receiver system of Figure 3 as well as in Figure 8. In Figure 11, an R-C integrator circuit is shown as integrator 59. A transistor 283 is shunted across the capacitor 282 with the collector and emitter connected to opposite capacitor sides. A resistor 284 is placed in series with the emitter to sense the polarity of shunted current. Transistor 283 acts as a switch having either: (1) a very high impedance that does not interfere with the charging of capacitor 282, or (2) a very low impedance that can quickly discharge the capacitor.

Transistor 283 is biased through a resistor 286 to normally provide its very-high impedance condition to capacitor 282, thus permitting it to charge. At the end of each integration period 2T, a short duty-cycle sampling pulse is received at terminal 28 from pulse generator 90 (see Figure 10) and applied to the base of transistor 283 to switch the transistor impedance to its very low value. Consequently, during the short sampling pulse, capacitor 282 discharges quickly through the transistor and its resistor 284. The polarity of each capacitor charge is sensed during its discharge through resistor 284 by a pulse of like polarity being generated across resistor 284 during the discharge. Thus, output terminal 76a provides pulses having the polarity of related capacitor charge, such pulses being shown in Figures 4(I) and 4(J).

The polarities of the short output pulses from each channel therefore represent alternate bits of detected information. Hence in Figure 8, the alternate bits of information are combined in bistable circuit 76 to provide an output signal having all of the received information, but demultiplexing must still be done to separate the received channels.

Thus, a serial-to-parallel multiplexer 211 receives the output of bistable circuit 76 and distributes the signal into its separate-channel components at appropriate terminals 221 through 224. Multiplexer 211 has an input 213 which receives multiplex timing signal $Nf_t$ from controller switch 112c and has another input 214 which receives timing signal $f_t$ from the controller. Such a multiplexer is only needed if three or more channels are transmitted. For two channels of information, channels I and II can respectively separate and detect one of the channels.

The separate channel outputs 221 through 224 are respectively provided as inputs to the bistable circuits 231 through 234, which shape the respective channel outputs to the commonly-used form resembling the respective channel signals to the modulator of the system. Thus, the output terminals 241 through 244 provide the data output of the invention; and they can be connected to respective keyers to drive conventional teletypewriter machines.

A form of multiplexer 211 is shown in Figure 9, and it is the inverse of parallel-to-serial multiplexer 113 in the transmitting portion of the system.

A shift-register 258, with four sections, has its last section connected to input terminal 212 to receive the serially-multiplexed data. Advancing pulses for the shift-register are received from a differentiating circuit 257 connected to input terminal 213 receiving square-wave $Nf_t$. Gates 251 through 254 are respectively connected to the outputs of shift-register sections 1 through 4. The gates each have another input which receives timing pulses at the $f_t$ channel rate from a differentiating circuit 256 that sharpens the pulses of the square wave $f_t$ applied to terminal 214. The gates distribute the data of the respective channels in the form of short duty-cycle pulses having the polarity of the data. The outputs of the respective gates are provided to the inputs of the respective bistable circuits 231—234 shown in Figure 8.

Although this invention has been described with respect to particular embodiments thereof, it is not to be so limited as changes and modifications may be made therein which are within the full intended scope of the invention as defined by the appended claims.

We claim:

1. Means for communicating a synchronous mark-space signal by a minimum frequency-shift technique comprising, means for phase-shifting a carrier wave at a continuous rate for a total of 90° in one direction per signal mark, means for phase-shifting said carrier wave at a continuous rate for a total of 90° in the opposite direction per signal space, means for conveying said signal to a receiver, and means for detecting said signal at said receiver.

2. Means for communicating a synchronous binary signal by a minimum frequency-shift technique comprising, means for constantly phase-shifting a carrier wave a total of 90° in one direction per mark-information bit of said signal, means for constantly phase-shifting the carrier wave a total of 90° in the opposite direction per space-information bit, means for conveying said carrier wave to a receiver, means for generating a wave phase-locked midway between the frequency extremes of said carrier wave, means for separating said wave into two parts separated by 90° of phase, means for phase-detecting the conveyed wave separately with said two parts, and means for sequentially detecting the polarities of said phase-detected waves to provide the information content of the received signal.

3. Means for communicating a synchronous mark-space signal by a minimum frequency-shift technique comprising means for phase-shifting a carrier wave at a continuous rate for a total of 90° in one direction per mark of said signal, means for phase-shifting said carrier wave at a continuous rate for a total of 90° in the opposite direction per space of said signal, means for transmitting said information-shifted carrier wave to a receiver, means for quadrature phase-detecting said wave in two channels at said receiver, means for amplitude-modulating in a cosine-squared manner the mark-space signal components in each of said channels, means for integrating the amplitude-modulated signal components in each channel over each of its respective marks and spaces, means for sampling the end of each mark or space integration in each channel, and means for reading-out said sampling to provide the detected signal.

4. Means for generating minimum-bandwidth frequency-shifted binary signals comprising, means for receiving a synchronous binary signal, means for alternately separating bits of said input signal into first and second channels, means for storing the signal bits in each of said channels for two bit periods of said input signal, means for providing a pair of heterodyning frequencies having a fixed 90° phase relationship with each other, means for phase-modulating said pair of frequencies respectively with the stored bits in said first and second channels, said phase-modulation in a single channel being 0° or 180° in correlation with the respective stored bits, means for amplitude-varying the magnitude of each of said channel signals in a half-sine-wave manner over the stored period for each channel bit, means for linearly combining said phase and amplitude-modulated waves of both channels into a single frequency-shifted signal, and means for transmitting said frequency-shifted wave.

5. Means for detecting a quadrature-phased frequency-shifted binary signal comprising means for receiving said signal, means for providing a local phase-stable wave, means for separating said wave into two component heterodyning waves phase-spaced by 90°, means for separately phase-detecting said received signal with each of said two local heterodyning waves to provide first and second component waves respectively in first and second channels having alternate bits of the received binary signal, means for amplitude-modulating the magnitude of each of said component waves in each channel by a half-cycle of a sine-wave over the duration of each channel bit, means for integrating each of said channel-component waves for the duration of each channel bit, means for sampling the integrated polarity at the end of each integration in each channel, means for quenching said integrations with each sampling, and means for triggering a bistable circuit to the polarity of said samplings in both channels to provide the detected signal.

6. A system for providing minimum-bandwidth frequency-shift signaling including, means for splitting a synchronous amplitude-shifted binary input signal into two component waves that are opposite sets of alternate bits of said input signal, means for storing each bit of each of said component waves for two bit periods of said input signal, a carrier frequency source providing two parts that are phase-shifted 90° with respect to each other, means for phase-modulating each part of said carrier frequency by one of said stored component waves, means for generating two weighting-function waves each having one-fourth the frequency of said synchronous input signal and being in respective synchronism with said component waves, means for magnitude-varying the amplitudes of said phase-modulated waves with the respective weighting-function waves, means for linearly combining said phase and amplitude-varied waves to provide a frequency-shifted wave, means for transmitting said frequency-shifted wave, means for receiving said wave, a stable local frequency source that is phase-locked with the mid-frequency of said received wave, means for separating said local wave into two parts phase-spaced by 90° with respect to each other, phase-detecting means for heterodyning said received wave in two phase-detected wave with said two parts, means for generating a pair of weighting-function sine-waves in respective synchronism with the amplitude variations of the two phase-detected waves, means for amplitude-modulating the magnitudes of the respective phase-detected waves with the respective weighting-function sine-waves, means for integrating said respective amplitude-modulated waves on a single-bit basis, means for sampling each of said bit integrations at the end of each, means for quenching said integrated wave prior to each integration, and means for combining said sampled waves to provide a detected binary signal.

7. Means for providing a time-multiplexed minimum frequency-shifted signaling system for up to N number of synchronous binary input signals each having a bit rate of $f_t$, comprising a high-stability frequency source providing a heterodyning frequency and a timing frequency, a channel-controller connected to said source to receive said timing frequency, said channel-controller providing first and second output-pulsed-timing waves synchronous with said input signals, with the first pulsed-timing wave having the signal-repetition rate $f_t$, and the second pulsed-timing wave having a repetition rate of $Nf_t$, a parallel-to-series multiplexer receiving input signals and providing a time-multiplexed output signal having binary form, dividing means connected to the channel-controller second output for repetition-rate dividing its pulse rate by two to provide two inverted pulsed waves, a pair of channels, each including an input gate having a pair of inputs, means connecting one input of each input gate to the output of said multiplexer, means connecting the respective outputs of said dividing means to the other inputs of said input gates to sample alternate bits of the signal from said multiplexer, each channel including a bistable-storage means connected to and triggered by an output of its input gate, means for splitting said heterodyning frequency into two components having a 90° phase difference, means for amplitude-modulating said two component waves at one-half the channel-timing rate, with the amplitude-modulations of said component waves having a 90° phase displacement, means for phase-modulating one component wave by 0° and 180° in correspondence with an output of the bistable-storage means of one channel, means for phase-modulating the other component wave by 0° and 180° in correspondence with the output of the bistable-storage means of the other channel, means for adding the amplitude and phase-modulated waves from both channels to provide a frequency-shifted wave, and means for transmitting said frequency-shifted wave.

8. A modulation system for a synchronous-binary input signal providing 90° phase-rotation-per-bit relative to a center frequency comprising, a center frequency source, and a timing-frequency source providing a pair of channel-timing waves having half the rate of said synchronous-binary signal, said pair of channel-timing waves being time interleaved, a pair of channels; each channel including at least a gate, a bistable-storage device, and a phase modulator; each gate having a pair of inputs, with one input of each gate receiving said signal and the other input receiving a different one of said pair of channel-timing waves, said gates sampling sequentially alternate bits of said binary signal, one of said bistable storage devices connected to the output of one of said gates to store alternate bits of said binary signal for two bit-periods of said signal, each phase-modulator having a pair of inputs with one connected to an output of one of said bistable-storage devices, means connecting said center-frequency source to the other input of each phase-modulator, ninety-degree phase-shift means being connected to the center-frequency input of one of said phase-modulators, means for half-sine-wave magnitude modulating the output signal of each phase modulator in phase with the two bit channel-periods to provide the output of the respective channel, said phase-modulator of each channel having its output phase switched by 0° or 180° by the stored bits in the respective bistable-storage device, and means for linearly adding the outputs of said channels to provide said frequency-shifted signal.

9. A modulation system as defined in claim 8 in which said binary input signal is time multiplexed by a plurality of input channels, comprising a channel-controller connected to said timing-frequency source to generate a pulse-timing wave having a repetition-rate at least equal to that of the modulation rate of said multiplexed signal, a parallel-to-series multiplexing means having at least one timing input connected to said channel-controller, respective inputs of said multiplexing means connected to said plurality of channels, and means connecting the output of said multiplexing means to said one input of each of said gates.

10. Means for detecting a minimum frequency-shifted signal having 90° phase-rotation-per-bit relative to a center frequency, comprising a highly stable local-frequency source providing an output heterodyning frequency equal to said center frequency, phase-control means for phase-locking said heterodyning frequency with said center frequency, first and second receiving channels, each including a phase-detector having a pair of inputs, one input of each phase-detector receiving said frequency-shifted signal, means for separating said heterodyning frequency into two parts phase-shifted 90° with respect to each other and connecting them respectively to the other inputs of said phase-detectors, said phase-detectors heterodyning the level of said phase-shifted signal into two separate varying-direct-current components having amplitude variations phase-spaced by 90°, means for applying amplitude-weighting functions to each of said component signals synchronously with their respective amplitude variation, a pair of direct-current integrators respectively receiving the weighted component signals and discontinuously integrating them on a single-bit basis, a pair of polarity sampling means connected to the respective integrators for sampling the integrated polarity at the ends of each bit, a bistable circuit being alternately triggerable by the respective sampling means according to their sampled polarities.

11. A detecting means as defined in claim 10 in which said frequency-shifted signal is time-multiplexed, comprising a time-base synchronizing means generating a timing wave synchronized with the amplitude variations of the output of one of said phase-detectors, a channel-controller connected to the output of said time-base synchronizer to generate a pulsed-timing wave having a repetition-rate equal to that of the modulation rate of the received multiplexed signal, series-to-parallel multiplexing means having at least one timing input connected to said channel controller, means connecting a signal input of said multiplexer to the outputs of said channels, and respective outputs of said multiplexing means providing the detected information carried by said frequency-shifted wave.

12. A demodulation system for a frequency-shifted signal having 90° phase-rotation-per-bit relative to a center frequency, comprising means for receiving said signal, stable frequency-source means for providing a phase-stable heterodyning frequency and a timing wave, a pair of channels; each including at least a phase detector, a direct-current integrator, and a sampler; with an input of each phase detector being connected to said receiving means, means connecting an input of the integrator to an output of the phase detector in each channel, and the sampler being connected to an output of the integrator in each channel, with an output of said sampler being an output of the respective channel, another input to each phase detector receiving said center-frequency, with means phase shifting center-frequency components provided to said phase detectors by ninety degrees with respect to each other, magnitude modulation means for providing halfsine-wave amplitude variation to said phase-detected waves, synchronizing means for maintaining the provided amplitude variation in each respective channel in synchronism and polarity with the amplitude variation of the signal found at the output of the respective phase-detector, and means for combining the outputs of said channels to provide a detected binary signal.

13. A frequency-shifted modulation system for a synchronous mark-space input signal comprising, a stable-frequency source, means for synchronizing said input signal with said source, first and second channels, and each channel including a gate having a pair of inputs, with means connecting one input to said stable-frequency source, a bistable storage device connected to the output of said gate to store alternate bits of said input signal, a phase-modulator being connected to said storage device and said frequency source having its output shifted by either 0° or 180° in correlation with the output of said bistable storage device, and an amplitude modulator connected to the output of said phase modulator to provide the output of a respective channel; said gates of the first and second channels being alternately enabled to pass alternate bits of information of said signal, means for phase-spacing the frequency outputs of said phase-modulators by an integer multiple of 90°, means providing fully-rectified waves being connected to said amplitude modulators to provide amplitude modulation of the signal in each channel in synchronism with the operation of its bistable storage device, a linear adder connected to the outputs of both channels for combining them into a single-composite signal, and means for transmitting said composite signal.

14. A system as defined in claim 13 in which said gates are alternately enabled by means comprising, an output from said frequency source providing a timing wave, a bistable frequency-dividing circuit connected to said frequency-source output to provide a pair of opposite-polarity outputs, one of said outputs being connected to one of said gates, and the other of said outputs being connected to the other of said gates.

15. A system as defined in claim 13 in which said connecting means to said stable-frequency source comprises a direct connection between said source and one phase-modulator, and a 90° phase shifter connected between said frequency source and the other phase modulator.

16. A system as defined in claim 14 comprising a binary frequency divider connected to one output of said bistable circuit, filtering means connected to said frequency divider to provide a sine-wave output, a full-wave rectifier being connected between said sine-wave output and the amplitude modulator of said first channel to provide the amplitude modulation, a 90° phase-shifter also being connected to said sine-wave output, and a second full-wave rectifier being connected between said 90° phase-shifter and the amplitude modulator of said second channel to control its amplitude modulation.

17. A demodulation system for a frequency-shifted signal having 90° phase-rotation-per-bit relative to a center frequency, comprising first and second detection channels; each channel including a phase-detector having a pair of inputs, with one input receiving said frequency-shifted signal, an amplitude modulator, means connecting the output of the phase detector to said amplitude modulator, a direct-current integrator connected to the output of said amplitude modulator, and a sampler and quencher connected to the output of said integrator, with said sampler providing the output of the respective channel; a bistable circuit being connected to the outputs of both channels and being alternately triggerable by them, said bistable circuit providing the modulated signal, a high-stability-frequency source providing a heterodyning output, carrier-phase-control means connecting said heterodyning output to the phase-detector in said first channel, a 90° phase-shifter being connected between said heterodyning output of said carrier-phase-control means and the phase detector in the second channel, a weighting-function generator providing a pair of full-wave rectified outputs respectively connected to the amplitude modulators in said first and second channels, said rectified waves being synchronous with expected amplitude variation at outputs of the respective phase detectors, pulse-generator means providing a pair of interleaved outputs timed respectively with minimum points in the amplitude variation in the respective phase-detector outputs, with the outputs of said pulse generator means being respectively connected to the samplers and quenchers in the respective channels.

18. A system as defined in claim 17 comprising a time-base synchronizer receiving a frequency output of said high-stability-frequency source, said synchronizer including a resolver phase-shifter connected to said frequency output, a full-wave rectifier connected to the output of the phase detector in said first channel, a pair of alternately actuated gates, each having a pair of inputs, with one input of each connected to the output of said rectifier, a pair of low-pass filters respectively connected to the outputs of said alternate gates, means for subtracting the outputs of said low-pass filters, servo-amplifier means amplifying the output of said subtracting means, a servo motor connected between the output of said servo amplifier and said resolver phase-shifter to adjust the amount of its phase shift; said pulse generator comprising a first frequency divider connected to the output of said resolver phase shifter for dividing its frequency down to the timing of said frequency-shifted signal, a binary-frequency divider connected to the output of said first frequency divider and providing a pair of oppositely phased outputs, first and second differentiating circuits respectively connecting the opposite outputs of said binary-frequency divider to the samplers and quenchers of said first and second channels, and said opposite outputs of said binary-frequency divider also being connected respectively to said alternately actuated gates to alternately enable them.

19. A frequency-shift modulation system for time-multiplexing a plurality of independent mark-space synchronous input signals comprising, a stable-frequency source, channel-controller means connected to said frequency source and providing first and second timing outputs, said first timing output having a rate equal to the synchronous rate of said input signals, said second timing output having a rate equal to an integer multiple of said first timing output, said integer being at least as great as the number of said input signals, a parallel-to-serial multiplexer having inputs respectively connected to each of said input signals and being connected to the first and second timing outputs of said channel-controller means, first and second channels; each channel including at least a gate having a pair of inputs and an output, a bistable-storage circuit connected to the output of said gate, and a phase-modulator having a pair of inputs and an output, with one input of said modulator connected to the output of said bistable-storage circuit, and the output of the respective channel being provided from the output of said phase modulator; a heterodyning-frequency output being provided by said stable-frequency source, means for amplitude-modulating said heterodyning-frequency output sinusoidally with one-hundred percent modulation, means connecting said modulated heterodyning frequency to the phase modulator in said first channel, means for phase-shifting the envelope of said modulated heterodyning wave by 90°, said 90° phase-shifting means being connected to the phase-modulator in said second channel, means connecting the output of said multiplexer to one input of each of said gates, a bistable-circuit connected to the second output of said channel-controller means and providing opposite-phased outputs, with means connecting said opposite-phased outputs respectively to the other inputs of said gates, and adding means for receiving the outputs of said phase modulators and combining them to provide a time-multiplexed output signal of said modulator.

20. A modulation system as defined in claim 19 in which said channel-controller means includes a plurality of frequency dividers connected to said stable frequency source, with one output from said frequency dividers being the first output of said channel-controller means, a channel-controller switch having at least a single pole and plural contacts, with the pole of said switch providing the second output of said channel-controller means, said plurality of contacts being respectively connected in order to various inputs and outputs of said frequency dividers to obtain different integer division ratios, with said division ratios being integer multiples of said first-controller output.

21. A system as defined in claim 19 having four synchronous independent input signals, said channel-controller means comprising first and second binary frequency dividers connected to the output of said stable-frequency source, the output of said second divider providing a pulsed wave synchronous with each of said input signals, a controller switch having at least a single pole and three contacts, with said pole providing the second-timing output of said controller means, said contacts being connected respectively to the input and output of said first divider and the output of said second divider.

22. A system as defined in claim 19 in which said parallel-to-serial multiplexer comprises, a plurality of "and" gates, each having an input connected to a respective one of said synchronous input signals, the other input to each of said gates being connected to the first-timing output of said channel-controller means, a shift register having a number of sections at least equal to the number of said independent input signals, said sections having information inputs respectively connected to outputs of said gates, timing inputs of each of said sections being connected to the second-timing output of said channel-controller means.

23. A modulation system as defined in claim 19 comprising a polarity-alternating means connected between the output of said multiplexer and the first input to each of said channel gates, said polarity-alternating means reversing the polarity of each pair of information bits provided from said multiplexer, a heterodyning-wave amplitude modulator connected to the output of said stable-frequency source, frequency dividing means connected to the second channel-controller output for frequency dividing by four and providing a sine-wave output to said amplitude modulator; said amplitude modulator including a first balanced modulator having one input connected to said sine-wave output and having another input connected to the heterodyning-frequency output of said stable-frequency source, an output of said first balanced modulator being provided to the phase modulator of said first channel, a first 90° phase shifter also connected to said sine-wave output, a second 90° phase-shifter also connected to the heterodyning-frequency output of said stable-frequency source, a second balanced modulator having a pair of inputs respectively connected to outputs of said first and second phase shifters, an output of said second balanced modulator being connected to the phase modulator in said second channel.

24. A modulation system as defined in claim 19 in which said polarity-alternating means comprises a balanced modulator having one input connected to the output of said multiplexer and having another input connected to one output of said bistable circuit, an output of said polarity-alternating means being connected to the first input of each of the gates in said channels, another bistable circuit connected to the output of said bistable circuit for frequency division, and a low-pass filter connected to the output of said another bistable circuit to provide said sine-wave output.

25. A demodulation system for a time-multiplex binary frequency-shifted input signal having 90° phase-rotation-per-bit relative to a center frequency comprising, means for receiving said input signal, a stable-frequency source providing first and second frequency outputs, carrier-phase-control means having a pair of inputs with one input connected to the first frequency output of said frequency source, and with the second input of said control means being connected to an output of said receiving means, said carrier-phase-control means providing a heterodyning output phase-locked with said center frequency, first and second channels connected to the output of said receiving means; each channel including a phase detector having a pair of inputs and an output, a direct-current integrator connected to the output of said phase detector, and a sampler and quencher connected to an output of said integrator and providing the output of its respective channel; a combining bistable circuit having inputs connected to the outputs of said first and second channels, a time-base synchronizing means having a pair of inputs and an output, with one input connected to the second frequency output of said frequency source, and the other input of said synchronizing means connected to the output of one of said phase detectors, said synchronizing means providing a pulsed output in synchronism with amplitude variations sensed in the output of said one phase detector, channel-controller means having a plurality of frequency dividers, with said frequency dividers connected in tandem to the output of said synchronizing means, a controller switch having at least a single pole and plural contacts, with said contacts being respectively connected in order to inputs and outputs of said frequency dividers of said controller means; pulse-generating means including first and second binary dividers connected in tandem to the pole of said controller switch, means connecting a pair of opposite outputs of the first bistable circuit to the respective samplers and quenchers in said first and second channels, a low-pass filter connected to the output of said second binary divider in said pulse-generating means to provide a sine-wave output; a weighting-function generator having a pair of inputs and a pair of outputs, with one input connected to the sine-wave output of said pulse-generating means, and means connecting the other input of weighting-function generator to the output of said carrier-phase-control means, the first and second outputs of said weighting-function generator being one-hundred percent amplitude-modulated by said sine-wave output, the first output being connected to an input of the phase-detector in said first channel, means for phase-shifting both the carrier and envelope of the second output of said weighting-function generator by 90° and connecting it to the phase-detector in said second channel, a series-to-parallel multiplexer having an input connected to the output of said combining bistable circuit, said multiplexer having a pair of timing inputs, with one being connected to the pole of said controller switch and the other being connected to the output of the frequency dividers in said channel controller, and said multiplexer providing a plurality of demodulated signal outputs, each output representing an independently demodulated signal.

26. A time-multiplexed demodulation system as defined in claim 25 in which said weighting-function generator includes first and second balanced modulators, and first and second 90° phase shifters, each balanced modulator having a pair of inputs and an output; the first balanced modulator having one input connected to said output of said pulse-generating means, another balanced modulator having a pair of inputs and an output, with one input being connected to an output of said second binary divider in said pulse-generating means, and its other output being connected to the output of said carrier-phase-control means, the output of said another balanced modulator being connected to the other input of said first balanced modulator, the output of said first balanced modulator being connected to the phase detector in said first channel, said first and second 90° phase shifters being respectively connected to the output of said another balanced modulator and to the output of said pulse-generating means, said second-balanced modulator having its inputs respectively connected to said first and second 90° phase shifters, the output of said second balanced modulator connected to the phase detector in said second channel.

27. A demodulation system as defined in claim 25 in which said time-base synchronizing means comprises a resolver phase shifter connected to the second output of said stable-frequency source, an output of said resolver being connected to the input of said channel-controller means, a servo motor controlling the setting of said resolver-phase shifter, a full-wave rectifier being connected to the output of the phase detector in one of said channels, a pair of alternately-enabled gates each having an input connected to the output of said full-wave rectifier, a pair of low-pass filters respectively connected to outputs of said gates, means for subtracting the magnitudes of the outputs of said low-pass filters, servo amplifier means for amplifying the substracted outputs and connected to said servo motor; said gates of said synchronizing means each having an input connected respectively to an opposite output of said first binary divider in said pulse-generating means to provide alternate enablement of said gates, means for differentiating the opposite outputs of said first binary divider and respectively connecting them to the samplers and quenchers in said first and second channels, another balanced modulator having a pair of inputs and an output, with one input connected to the output of said carrier-phase-control means, the other input being connected to an output of the second binary divider in said pulse-generating means, and the output of said another balanced modulator being connected to said other input of said weighting-function generator.

28. A demodulation system as defined in claim 25 in which said series-to-parallel multiplexer comprises a shift-register circuit having a signal input connected to said combining bistable circuit, said shift-register having a plurality of bit sections at least equal in number to the received channels, a timing input of each section being connected to the pole of said controller switch, a plurality of gates each having a pair of inputs and an output, with one input connected to a respective output of one of said sections of said shift-register, the other input of each gate being connected to the output of the frequency dividers of said channel-control means, respective outputs of said gates providing independently demodulated signals.

No references cited.